US008341665B2

(12) United States Patent
Atsmon et al.

(10) Patent No.: US 8,341,665 B2
(45) Date of Patent: Dec. 25, 2012

(54) PROVIDING CONTENT RESPONSIVE TO MULTIMEDIA SIGNALS (76) Inventors: Alon Atsmon, Kiryat Ono (IL); Saar Shai, Kochav Yair (IL)

(*) Notice: Subject to any disclaimer, the term of this patent is extended or adjusted under 35 U.S.C. 154(b) by 824 days.

(21) Appl. No.: 12/403,539

(22) Filed: Mar. 13, 2009

(65) Prior Publication Data

US 2010/0063880 A1 Mar. 11, 2010

Related U.S. Application Data (63) Continuation of application No. PCT/IL2007/001138, filed on Sep. 16, 2007.

(51) Int. Cl.
*H04N 7/10* (2006.01)
(52) U.S. Cl. ............... 725/34; 725/32; 725/33; 725/35; 725/36

(58) Field of Classification Search ............... 725/32–36
See application file for complete search history.

(56) References Cited

U.S. PATENT DOCUMENTS 6,718,551 B1* 4/2004 Swix et al. ............... 725/32
7,752,642 B2* 7/2010 Lemmons ................ 725/32

* cited by examiner

*Primary Examiner* — Hunter B Lonsberry (57) ABSTRACT

A method of providing information including providing a communication session of at least one of audio and video media and applying automatic recognition to media transferred on the communication session. An advertisement is selected by a processor, based on the automatic recognition and non-advertisement information is selected by the processor, responsive to the automatic recognition. The selected advertisements and the selected non-advertisement information, are presented during the communication session.

33 Claims, 6 Drawing Sheets

PROVIDING CONTENT RESPONSIVE TO MULTIMEDIA SIGNALS

CROSS-REFERENCE TO RELATED APPLICATIONS

This application is a continuation of international PCT Application number PCT/IL07/01138 titled "PROVIDING CONTENT RESPONSIVE TO MULTIMEDIA SIGNALS" filed Sep. 16, 2007 which claims the benefit of priority on U.S. Provisional Application No. 60/825,555 titled "Process matching captured signal to relevant content" filed Sep. 13, 2006; the entire contents of all of which are hereby incorporated by reference.

FIELD OF THE INVENTION

The present invention relates to pattern recognition systems.

BACKGROUND OF THE INVENTION

Speech recognition systems are used in various applications to allow people to provide speech commands to electronic devices, such as telephones and computers.

Speech recognition is also used for translation and transcription.

EP patent publication 1696338, published Aug. 30, 2006, titled "Individual Simultaneous Translator", the disclosure of which is incorporated herein by reference, describes a telephone that serves additionally as an automatic translator for speech in the surroundings of the telephone, as well as speech received over the telephone line. The translation is sounded to the user instead of the original.

Similar translators are described in GB patent publication 2421815, to O'Donnel, and US patent publication 2002/0181669 to Takatori et al., published Dec. 5, 2002, the disclosures of which are incorporated herein by reference.

US patent publication 2006/0074623 to Tankhiwale, published Apr. 6, 2006, the disclosure of which is incorporated herein by reference, describes using speech recognition for automatic real time transcription of voice conversations over a communication network.

Image recognition is used in various applications.

US patent publication 2007/0081744 to Gokturk et al., published Apr. 12, 2007, the disclosure of which is incorporated herein by reference, describes a method of cataloging images based on image recognition.

Advertisement is a powerful method of enhancing business. In many cases it is desired to target advertisements to users having the most chances of being interested in the advertised product.

U.S. patent publication 2005/0234779 to Chiu et al., published Oct. 20, 2005, the disclosure of which is incorporated herein by reference, describes a method of targeting advertisements.

PCT patent publication WO 2007/026320 to Hemar Elad et al., published Mar. 8, 2007, the disclosure of which is incorporated herein by reference, describes a computer client which identifies words in a call using speech recognition or identifies the gender of a speaker and accordingly targets advertisements. This publication also suggests identifying a tone, voice level or other emotion and controlling an avatar accordingly. The publication recognizes the problem of convincing people to allow targeted advertisement, and suggests that the call service be supplied on condition that the advertisements are viewed. This, however, limits the provision of advertisements to services in which the advertisements can substantially subsidize the communication costs.

U.S. provisional patent application 60/765,743, filed Feb. 7, 2006, the disclosure of which is incorporated herein by reference, describes using a voice recognition engine to convert the content of a conversation between two parties into text, which is analyzed in order to select advertisements to be presented to users.

Not always, however, do these systems provide sufficiently targeted advertisements.

Another, more general, problem with advertisements is that people tend to ignore them. Even in cases in which they receive cheap or free services which include advertisements, people tend to ignore the advertisements. In addition, in some cases the services provided in exchange for receiving advertisements are too expensive, making the provision of the service for free non-economical.

SUMMARY OF THE INVENTION

An aspect of some embodiments of the present invention relates to a media (i.e., sound and/or video) communication device (e.g., mobile station, computer with instant imaging software) which provides one or more information services together with targeted advertisements, to users conducting a communication session, based on speech recognition of the contents of the session. In some embodiments of the invention, the information services are provided without charge. Providing the user with information services is an incentive for the user to allow the speech recognition, and thus any antagonism to speech recognition for advertisements may be alleviated.

In some embodiments of the invention, the one or more information services comprise text transcription and/or text translation of a conversation or dictation or portions thereof. Alternatively or additionally, the one or more information services comprise dictionary, encyclopedia or other reference source information on words, phrases or groups of words included in the session. In some embodiments of the invention, a web search of a word or set of representative words from the communication session is provided. Further alternatively or additionally, the information services include table information such as time table information of transportation services, opening hours of shops or other services and personal contact information, such as telephone numbers, messaging nick names and/or email addresses. In an exemplary embodiment of the invention, the information services include information on businesses in a specific area, such as supplied by the skype-find service (described at http://www.skype.com/intl/en-gb/help/guides/skypefind.html). In some embodiments of the invention, the one or more information services comprise map displays of areas discussed in the communication session. In still other embodiments of the invention, the one or more information services include whether information, news, sports and/or other updates related to keywords used in the communication session.

Optionally, the information is provided from a remote location, for example from the Internet. Alternatively or additionally, the information is provided from a memory of the voice communication device. For example, in response to a name mentioned on the communication session, the communication device may present information it stores on the name, for example a telephone number. In some embodiments of the invention, the information is provided from a database, website or other source which is not affiliated with the communication device or with software controlling the signal recognition.

An aspect of some embodiments of the invention relates to displaying to one or more participants of a multi-participant conversation, additional information accessed over the Internet or from a designated database on topics discussed in the conversation, identified by applying speech recognition to the conversation. Optionally, the additional information includes dictionary, encyclopedia or map information on terms used in the conversation.

In some embodiments of the invention, an additional information device provides automatically a list of additional information pages suggested responsive to the conversation. The human user selects from the list, the data that is to be downloaded or otherwise accessed. In some embodiments of the invention, the selections of the human users are used to further adjust the data provided to users based on speech recognition. For example, the positions of items in the list may be adjusted according to the popularity of the item or of the type of item (e.g., map, dictionary entry, price comparison). Alternatively or additionally, highly popular items or types of items may be displayed automatically with the list or instead of the list.

In some embodiments of the invention, the additional information is downloaded from a plurality of unrelated Internet sites.

An aspect of some embodiments of the invention relates to automatically displaying content selected responsive to results of image recognition of a video stream or of still images. Optionally, the content is displayed in real time, within less than 10 minutes or even less than a minute from the image recognition.

In some embodiments of the invention, the video stream is a real time video stream, such that the content is displayed within less than 15 minutes or even less than two minutes from acquiring the portion of the video stream causing the selection of the displayed content. Optionally, the video stream comprises a video conferencing video stream. Alternatively or additionally, the video stream comprises a stream from a surveillance camera, a traffic camera or any other monitoring video camera. The images acquired by the monitoring camera are optionally provided to a monitoring station in addition to being processed for content selection, such that the content selection does not require additional cameras. In some embodiments of the invention, the content is displayed near or at the location of the captured images or video stream. Alternatively, the content selected responsive to the image recognition is displayed in a different location than the images. In an exemplary embodiment of the invention, the information selected responsive to images acquired by a monitoring camera is displayed on public terminals like electronic billboards designed to present advertisement clips.

While in some embodiments of the invention people in the acquired images are aware that content is being selected responsive to the acquired images, in other embodiments people in the acquired images are not aware of the provision of content in response to the image recognition.

Optionally, the displayed content comprises advertisements selected responsive to the images or video stream. For example, if the image recognition identifies a traffic jam, the display may show advertisements for train services or other traffic avoidance measures, while when the road is clear it displays advertisements for safe driving. Alternatively or additionally, the sizes of the advertisements and/or the amount of details used depends on the amount of traffic on the road and/or the average speed.

In an exemplary embodiment of the invention, advertisements are displayed at a location viewable by people appearing in the acquired video stream. Optionally, the advertisements are selected responsive to attributes of the imaged people. For example, when a fat person is identified passing by the camera, an advertisement for a diet may be displayed.

An aspect of some embodiments of the present invention relates to using a semantic map in matching content to a word or a word sequence. Words from the sequence are searched for in the semantic map and content is matched to the words, by a processor, based on their location in the map. In some embodiments of the invention, the semantic map is partially or entirely organized in a hierarchy.

In some embodiments of the invention, the word sequence is collected using speech recognition. Alternatively, the word sequence is taken from a text document. Further alternatively, the word sequence is taken from sub-vocal signals. Alternatively, the word sequence is taken from a visual reading of lips movement, that may not be accompanied by sound.

In some embodiments of the invention, the hierarchic semantic map is taken from an Internet site or database external to the content provision system, such as Wikipedia. Alternatively, the hierarchy is defined specifically for the content provision.

The provided content may include advertisements and/or suggested key words for representing the word sequence.

An aspect of some embodiments of the present invention relates to using a hierarchic word map in aiding speech recognition. Optionally, the words preceding or surrounding an unclear word are placed on the map, together with possibilities of interpreting the unclear word. The possibility to represent the unclear word is selected at least partially responsive to the distances between the possibilities and the preceding or surrounding words on the map.

An aspect of some embodiments of the present invention relates to a method of providing information to a mobile terminal such as a cellular phone, a wireless application protocol (WAP) unit or a wireless LAN unit, responsive to speech recognition of speech signals on a voice channel of the mobile terminal.

In some embodiments of the invention, the content is provided on a channel separate from the voice channel carrying the speech signals, while the voice channel is carrying the speech signals.

An aspect of some embodiments of the invention relates to displaying advertisements on a screen of a mobile station, for example instead of a screen saver, responsive to detection of whether an earphone is connected to the mobile station. In some embodiments of the invention, advertisements are only displayed when an earphone is connected to the cellular phone, as when there is no earphone used during a telephone conversation, the screen of the mobile station is generally not viewable by a human user. In some embodiments of the invention, advertisements are only displayed when the mobile station or the host device is detected to be in a preferable state for the users attention, such as when downloading a small file or when waiting for a call to be answered. Alternatively, the mobile station tracks the amount of time in which advertisements were displayed while the earphone is utilized and/or while the mobile station is in a preferable state and the advertiser is billed accordingly. Further alternatively or additionally, the duration of displaying advertisements is adjusted responsive to whether the mobile station is connected to an earphone and/or whether the mobile station is in a preferable state.

An aspect of some embodiments of the invention relates to apparatus which provides content responsive to sub-vocal speech, electromyography or visual lip reading. The content may include, for example, advertisements, dictionary, encyclopedia, map or other information expansion on a word or term and/or detail information.

An aspect of some embodiments of the invention relates to planting a microphone and/or video camera in a location in which people are expected to view advertisements or a shop setting. Sounds and/or images acquired by the microphone and/or camera are analyzed to collect feedback on the advertisements. Optionally, the sound and/or video stream are automatically analyzed to determine portions which may be relevant to the advertisement, and these portions are provided to a human for further analysis. Alternatively, the sound of the portions of interest is automatically transcribed using speech recognition methods and the transcription and/or an analysis thereof is provided to the human for further analysis. In some embodiments of the invention, the camera captures the impressions of people viewing the advertisements or shop settings. Optionally, the images are automatically analyzed using face recognition.

In some embodiments of the invention, the shop setting comprises a web site providing an electronic shop.

In some embodiments of the invention, feedback is collected by the hardware of the user's communication device, such as an integrated camera in a cellular phone or webcam connected to a PC. Optionally, feedback information can be collected while the user is exposed to commercial content while using his communication device. Optionally, the commercial content presented to the users on which feedback is collected can originate from any source known in the art and/or may be in accordance with any of the embodiments described herein.

An aspect of some embodiments of the invention relates to a speech recognition unit which is configured to access a web site or a database for aid in the speech recognition. In some embodiments of the invention, the speech recognition unit is configured to access a web site or external database not associated with a manufacturer of the speech recognition unit. Optionally, the speech recognition unit is configured to access a plurality of different web sites. Optionally, the accessed web site provides a word list or search results which aid in word disambiguation.

There is therefore provided in accordance with an exemplary embodiment of the invention, a method of providing information, comprising providing a communication session of at least one of audio and video media, applying automatic recognition to media transferred on the communication session, selecting an advertisement, by a processor, based on the automatic recognition, selecting non-advertisement information, by the processor, responsive to the automatic recognition and conveying the selected advertisements and the selected non-advertisement information, during the communication session.

Optionally, providing the communication session comprises providing a communication session of a single human, with an automatic opposite end terminal. Alternatively or additionally, providing the communication session comprises providing a communication session between a plurality of human users. Optionally, providing the communication session comprises providing a communication session with at least one instant messaging software end point. Optionally, providing the communication session comprises providing a communication session with at least one mobile station end point.

Optionally, applying automatic recognition to media transferred on the communication session comprises applying the automatic recognition by an end terminal of the communication session. Optionally, applying the automatic recognition by an end terminal of the communication session comprises applying the automatic recognition with aid from a remote server. Optionally, selecting non-advertisement information comprises selecting a dictionary or encyclopedia entry on a term identified on the communication session by the automatic recognition. Optionally, selecting non-advertisement information comprises selecting a map related to a term identified on the communication session by the automatic recognition.

Optionally, selecting non-advertisement information comprises selecting the non-advertisement information also responsive to information on a human participant in the session, which information was collected by the processor before the communication session began.

Optionally, conveying the advertisement and non-advertisement information comprises displaying both the advertisement and non-advertisement information on a single display. Optionally, conveying the advertisement and non-advertisement information comprises displaying on a display of an end terminal of the communication session. Optionally, conveying the advertisement and non-advertisement information comprises conveying at least one of the advertisement and non-advertisement information audibly. Optionally, conveying the advertisement and non-advertisement information comprises conveying at least one of the advertisement and non-advertisement information to a human user at least 30 minutes after it is selected. Optionally, selecting the non-advertisement information comprises selecting information from a web site of user generated content. Optionally, selecting the non-advertisement information comprises selecting a transcription or translation of audio signals passing on the connection. Optionally, selecting the non-advertisement information comprises selecting information in a local memory associated with the processor. Optionally, selecting the non-advertisement information comprises selecting information retrieved from a remote server.

There is further provided in accordance with an exemplary embodiment of the invention, a communication terminal, comprising a communication interface configured to conduct at least one of audio and video media communication sessions with remote terminals, a display and a processor configured to apply automatic recognition to media transferred through the communication interface, and to select both advertisement and not-advertisement information responsive to the recognition and to display the selected information on the display.

Optionally, the communication interface comprises a wireless interface.

There is further provided in accordance with an exemplary embodiment of the invention, a method of providing information, comprising providing a communication session of at least one of audio and video media, applying automatic recognition to media transferred on the communication session, selecting information, by a software running on a processor, based on the automatic recognition and downloading the selected information from at least one web site not associated with a manufacturer of the software.

Optionally, selecting the information comprises displaying a list of the possible information selected responsive to the automatic recognition and receiving an indication of an entry in the list. Optionally, selecting the information comprises selecting responsive to selections of information by human users in previous communication sessions. Optionally, downloading the selected information from at least one web site comprises downloading from a plurality of non-associated web sites.

There is further provided in accordance with an exemplary embodiment of the invention, a method of providing information, comprising providing a communication session of at least one of audio and video media, applying automatic recognition to media transferred on the communication session, displaying a list of possible information selected responsive to the automatic recognition, receiving an indication of an entry in the list and displaying the information corresponding to the entry of the list pointed to by the received indication.

There is further provided in accordance with an exemplary embodiment of the invention, a method of providing information, comprising providing a video stream, applying automatic image recognition to the video stream, selecting information responsive to the image recognition and displaying the selected information within ten minutes from performing the image recognition leading to selection of the displayed information.

Optionally, displaying the selected information comprises displaying within ten minutes from acquiring images of the video stream leading to the selection of the information, by a video camera. Optionally, providing the video stream comprises providing a video stream acquired by a portable video camera. Optionally, providing the video stream comprises providing a video stream acquired by a camera included in a mobile communication terminal. Optionally, displaying the selected information comprises displaying advertisements.

There is further provided in accordance with an exemplary embodiment of the invention, a method of matching information to a word sequence, comprising providing a semantic map, receiving a word sequence, by a processor, determining locations of words of the sequence in the semantic map, selecting information for the word sequence, at least partially responsive to the locations of the words of the sequence in the map and displaying the selected information.

Optionally, providing the semantic map comprises providing a map from a web site of user provided content. Optionally, selecting the information comprises providing a list of keywords and corresponding information for display and selecting a keyword from the list based on its distance in the semantic map from words of the sequence. Optionally, receiving a word sequence comprises receiving a word sequence received from a speech recognition unit.

There is further provided in accordance with an exemplary embodiment of the invention, a wireless communication terminal, comprising a communication session interface configured to conduct at least one of audio and video media communication sessions with remote terminals, over a wireless link, a display and a processor configured to perform media recognition on media passing through the communication interface, to select information responsive to the recognition and to display the selected information on the display.

Optionally, the terminal includes a server interface configured for communicating with a media recognition server, the server interface adapted to operate in parallel with the communication session interface, and wherein the processor is configured to perform at least one of media recognition, selection of information and display of the selected information utilizing information received over the server interface. Optionally, the processor is configured to download the selected information through the server interface while the communication session interface is carrying a media session.

There is further provided in accordance with an exemplary embodiment of the invention, a wireless communication terminal, comprising a communication session interface configured to conduct at least one of audio and video media communication sessions with remote terminals, over a wireless link, a display, and a processor configured to display advertisements on the terminal responsive to a state of the wireless terminal. In some embodiments of the invention, the wireless terminal has an earphone interface and the processor is configured to display advertisements responsive to whether an earphone is coupled to the earphone interface. Optionally, the processor is configured to display advertisements on the display only when an earphone is coupled to the earphone interface. Optionally, the processor is configured to track the amount of time that advertisements were displayed while an earphone was coupled to the earphone interface.

There is further provided in accordance with an exemplary embodiment of the invention, a method of providing a person with information, comprising acquiring sub-vocal speech from a person, identifying words in the acquired sub-vocal speech and displaying content to the person responsive to the identified words. Optionally, acquiring the sub-vocal speech comprises acquiring by electrodes near the vocal chords of the person.

There is further provided in accordance with an exemplary embodiment of the invention, a method of acquiring feedback signals on display advertisements or presented information, comprising applying media recognition to the acquired signals generated in response to advertisements and/or presented information. Optionally, advertisements and/or presented information may or may not be provided by an external source. Optionally, acquired feedback is used for commercial and/or statistical objects and/or for improving media recognition and/or matching advertisements and/or additional information.

There is further provided in accordance with an exemplary embodiment of the invention, a method of acquiring feedback on a commercial setting, comprising providing a commercial setting, positioning a camera or microphone directed at a position from which individuals can view the commercial setting, acquiring media signals by the camera or microphone, applying media recognition to the acquired signals and generating feedback on the commercial setting having a storage size of less than 10% of a size of the acquired media signals.

Optionally, generating the feedback comprises providing portions of the media signals including words which may relate to the commercial setting. Optionally, providing the commercial setting comprises providing an e-shop.

BRIEF DESCRIPTION OF THE DRAWING

The present invention will now be described in the following detailed description of exemplary embodiments of the invention and with reference to the attached drawing, in which dimensions of components and features shown are chosen for convenience and clarity of presentation and are not necessarily shown to scale. Generally, only structures, elements or parts that are germane to the discussion are shown in the figure.

DETAILED DESCRIPTION OF SOME EMBODIMENTS

Overview

Figure 1:
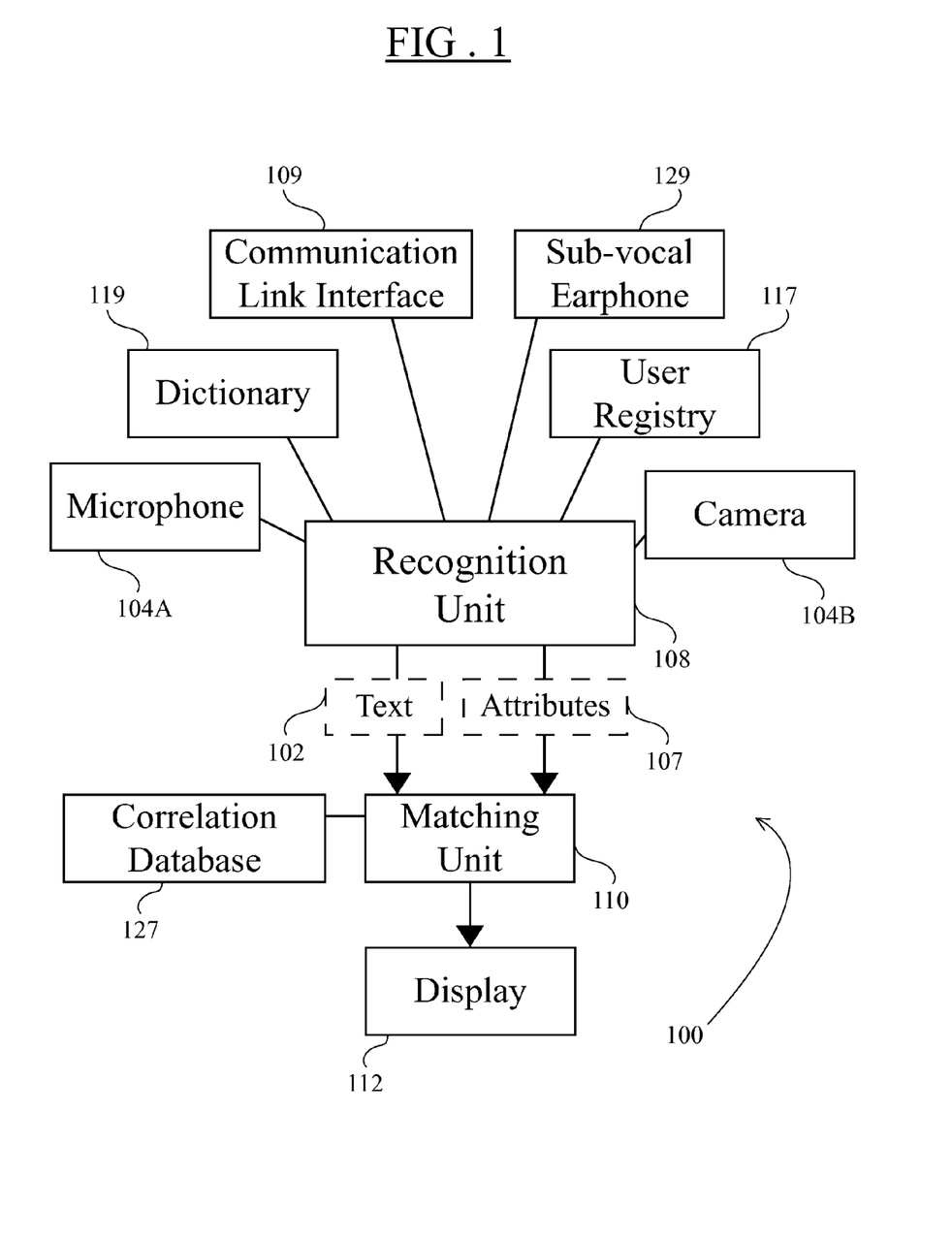
FIG. 1 is a schematic illustration of an information provision system, in accordance with an exemplary embodiment of the invention.

FIG. 1 is a schematic illustration of an information provision system 100, in accordance with an exemplary embodiment of the invention. System 100 receives input audio signals through an input interface, such as a microphone 104A, or a communication link interface 109. In some embodiments of the invention, system 100 also includes a camera 104B through which it receives still or video images. A signal recognition unit 108 receives the input sound and/or image signals and converts the speech and/or images into text 102 and/or identifies in the signals words, terms, emotions and/or other attributes 107. A matching unit 110 selects content to be provided to a user in response to text 102 and/or attributes 107. The selected content is presented on a display 112 to a user.

Input

In some embodiments of the invention, the input signals are acquired through a microphone 104A of system 100. The audio signals may be acquired by a software associated with system 100 or by a software of a different task, such as an instant messaging software, running on apparatus implementing system 100. Alternatively, recognition unit 108 may receive audio signals acquired by a separate device, optionally at a remote location. For example, recognition unit 108 may be part of a communication device which receives audio signals from a remote location, for example as part of a real time communication session (e.g., a telephone call). The communication device may comprise a line telephone, a cellular terminal, personal digital assistant (PDA) or any other mobile terminal or a computer, such as one running an immediate messaging process. In an exemplary embodiment of the invention, the communication device comprises an HP 6515 PDA. In some embodiments of the invention, communication session passes over a cellular network, a WiFi or WiMax network or any other wireless network. In still other embodiments of the invention, the audio and/or image signals are received through a direct wire, cable or wireless connection from a TV, radio or other receiver.

In some embodiments of the invention, the acquired audio signals are generated by a human user without relation to their provision to recognition unit 108. Possibly, the human user is not aware that the audio signals are provided to recognition unit 108. Optionally, the audio signals provided to recognition unit 108 are provided to an additional unit, such as a speaker device which sounds the audio signals and/or to a telephone connection leading the signals to a remote location.

Alternatively or additionally to acquiring audible sound signals, recognition unit 108 receives sub-vocal signals, such as described in US patent publication 2006/0129394 to Becker et al., in US patent publication 2007/0106501 to Morita et al. and/or in "Subvocal Speech Demo", downloaded from http://www.nasa.gov/center/ames/news/releases/2004/subvocal/subvocal.html, the disclosures of all of which are incorporated herein by reference. Optionally, the sub-vocal signals are collected using electrodes on the skin above the vocal chords of a person. Alternatively or additionally, sub-vocal signals are collected using an electrode included in an earphone 129 collecting sub-vocal signals passing through the skin and/or by a camera or other sensor directed at the vocal chords of the individual whose sub-vocal signals are being monitored.

In other embodiments of the invention, camera 104B is used to read the lips of a human speaker. In still other embodiments of the invention, system 100 receives text input, optionally in addition to audio signals. For example, if system 100 is implemented on a cellular telephone, it may receive in addition to audio signals of telephone conversations also SMS text. The text messages are optionally provided directly to matching unit 110 for selection of content to be displayed responsive to the text.

In some embodiments of the invention, the input signals are real time signals provided to recognition unit 108 immediately after they are generated. The signals may belong, for example, to a telephone or instant messaging conversation, to a face-to-face conversation in the vicinity of system 100 or elsewhere or to sound signals coming from a radio, television, computer, CD player, MP3 player or any other appliance which generates speech signals (including songs). In an exemplary embodiment of the invention, recognition unit 108 operates on a lecture and system 100 provides background material responsive to keywords recognized in the lecture. Furthermore, recognition unit 108 may identify non-speech sounds, such as noises of home appliances, cars or pet animals.

In other embodiments of the invention, recognition unit 108 receives signals from a prestored file, for example music files or lectures located on the Internet or in a local directory of a computer or mobile station hosting system 100. When operating on non-real-time files, system 100 may operate in a single pass, or may perform two or more passes, identifying the main points of the file and providing content accordingly.

For example, system 100 may operate on user-generated media-content displayed in a web site, such as "youtube". The content provided by system 100 may be displayed by the website along side the user content or may be accessible by user's applying a suitable control. Alternatively or additionally, the content provided by system 100 is used by the management of the website in monitoring the user generated content. Alternatively or additionally, the captured input signals or feedback signals of the user are used by the management of the website, and/or by sponsors of the website.

Recognition

In an exemplary embodiment of the invention, recognition unit 108 comprises a speech recognition engine of any type known in the art, which converts the speech content into text. The speech recognition is optionally performed using any method known in the art, including human speaker dependent methods in which samples of the human speaker's speech are taken in advance, and human speaker independent methods. The speech recognition may be performed using the most sophisticated and processing intensive methods, but this is not necessary in all the embodiments of the invention. In fact, in some embodiments of the invention, a light weight speech recognition process is used, which can be easily mounted on low processing power mobile stations. While such process may have an error rate which is too high for transcription of an entire communication session, it is sufficient to provide advertisements and/or additional information related to the session at a relatively high accuracy level.

In some embodiments of the invention, the results of the speech recognition are verified in a spell check dictionary 119 or other word pool (e.g., an encyclopedia), in order to remove mistakes. Optionally, the dictionary or other word pool is a network based pool providing service to a plurality of recognition units 108, such as a web based word pool. In some embodiments of the invention, the word pool is managed by an entity not associated with system 100. Using a web based word pool makes the speech recognition software more compact and allows simple update of the word pool. In some embodiments of the invention, the web based server is distanced by at least a kilometer from recognition unit 108. Optionally, the dictionary or other word pool provides user based content. Alternatively or additionally to using a word pool, terms are searched for on the web and if the term has a low hit rate it is replaced with a similar term having a much higher hit rate.

Recognition unit 108 optionally interprets the entire content of the audio signals it receives. Alternatively, recognition unit 108 only interprets some of the signals received, for example by finding specific words from a dictionary and/or specific keywords associated with available information to be provided. Alternatively or additionally, recognition unit 108 identifies emotions, accent or other beyond-text information in the audio signals, for example any of those described in the above mentioned PCT patent publication WO 2007/026320. Optionally, the identified emotions are provided to matching unit 110, separately from the text. Alternatively or additionally, the identified emotions are implanted in the text in the form of predetermined symbols designating the different emotions. For example a sequence of exclamation marks can indicate excitement.

In some embodiments of the invention, the text is analyzed to determine emotions of the human speaker. For example, the analysis may identify curse words, repetitions and/or broken sentences as a sign of anger.

The acquired audio signals are optionally generated by a single source, for example in a lecture, from a conversation between a human and an automatic answering system (e.g., voice mail) or signals collected from a single side of a conversation. Alternatively, acquired audio signals are of a conversation of a plurality of people. In some embodiments of the invention, recognition unit 108 does not differentiate between the people participating in the conversation. Alternatively, recognition unit 108 additionally performs speaker recognition, by determining speech attributes (e.g., frequencies used, pitch) of speech portions and determining whether they match speech attributes of other speech portions.

In some embodiments of the invention, recognition unit 108 stores locally speech attributes of users of system 100 and/or of people whose speech was previously handled by system 100. The stored attributes are optionally used to differentiate between speakers in a conversation and/or to aid in the speech recognition and/or in the matching of content by matching unit 110. Alternatively or additionally, a central user registry 117 stores speech attributes and/or samples for users, such that different recognition units 108 on different locations can use user information accumulated by other systems 100. Optionally, users installing software of recognition unit 108 and/or using system 100, are requested to enroll with registry 117 and provide speech samples to aid in recognizing their speech. Alternatively or additionally, users are encouraged during speech recognition sessions to enter the name of speakers whose speech is recognized. The names are uploaded to registry 117 along with speech samples and/or speech attribute information for further use. In some embodiments of the invention, at the beginning of a conversation, one of the users indicates to system 100 the names of some or all of the participants, to aid recognition unit 108 in identifying the users and their attributes.

Registry 117 may be configured to limit the use of uploaded data only to the system 100 uploading data or only to a group of systems with which it is associated. Alternatively, registry 117 is configured to share uploaded data between many systems 100.

Optionally, during a conversation recognition unit 108 determines which individual voiced each speech portion. For portions not matching any known users, recognition unit 108 optionally assigns a general tag, such as "speaker 1", and further portions belonging to the same speaker are associated with this tag. As mentioned above, the speaker and/or anyone knowing the name of the speaker may insert the name to the system.

Optionally, during a conference call, recognition unit 108 identifies the person currently speaking based on voice attributes, for example by comparing to a library of voice attributes of the participants in the conference call and/or using a neural network. In an exemplary embodiment of the invention, the names of the identified persons are displayed on one or more of the terminals participating in the conference call to aid the participants in identifying the current speaker. In some embodiments of the invention, the names of the participants are displayed together with other information associated with the named participant, such as an image, portrait, personal avatar, alias, online profile and/or web persona. The other information may also be displayed instead of the name or with a pseudo name, for example when the name should be kept secret. Alternatively to providing the name of the speaker, recognition unit 108 tags the different speakers with arbitrary tags, such as "speaker 1", "speaker 2". Instead of totally arbitrary tags, the tags used are chosen responsive to the voice or speech attributes of the user. For example, a fast speaker may be tagged as "fast speaker" and a person with a deep voice may be tagged "deep voice". Other exemplary tags could include, for example, "the fast earlier", "the lady" and "nervous guy".

In some embodiments of the invention, during the conference call the participants can enter the name of the person identified by any of the tags, so that thereafter the name is used instead of the tag. The name and voice attributes may be saved for further conference calls conducted at later times.

Alternatively or additionally, recognition unit 108 receives indications as to the source of the speech at every time point, for example, based on signals received from the communication terminals participating in the session.

In some embodiments of the invention, system 100 determines from the sound signals the distance from the microphone through which they were acquired to their source, and thus differentiates between signals from different sources. Optionally, an array of microphones is used to determine the locations of different sources.

In some embodiments of the invention, the knowledge on the identity of the speaker is used in simplifying the speech recognition. For example, user registry 117 may include for some or all of the users sample words and their interpretation, specific accent information and/or voice attributes which aid in the speech recognition. The information may be collected at an enrollment stage, during previous speech sessions of the speaker and/or continuously during the current speech recognition session.

Matching

In some embodiments of the invention, matching unit 110 provides a transcription of the audio signals. Alternatively or additionally, matching unit 110 translates the speech recognized audio signals into one or more languages other than the original language.

Additional Information

In some embodiments of the invention, matching unit 110 provides additional information, beyond that included in the input audio signals, about words or subjects identified in the audio signals. Matching unit 110 optionally manages a correlation database 127 which correlates between words and the content to be provided if the word is identified in the text. Alternatively or additionally, correlation database 127 is managed on a central server accessible for example over the Internet.

The additional information optionally comprises non-commercial information. Optionally, the additional information is not sponsored by an entity interested in distributing the information and there is no entity that paid for distribution of the information.

Optionally, for geographical names, a map is provided showing the mentioned location. Words considered rare optionally initiate display of a dictionary interpretation of the word. Alternatively or additionally, words or phrases having a corresponding encyclopedia entry initiate display of the entry.

Alternatively or additionally, a set of rules governing which display is provided for each word is defined. The rules are optionally customizable by a user. In an exemplary embodiment of the invention, if the word is a place on a map, the map is displayed. Otherwise, if the word appears in an encyclopedia, the encyclopedia entry is displayed. If neither on a map or in an encyclopedia, matching unit 110 optionally determines whether the word is a rare word, for example by counting its occurrence in a web search. If the word is rare, a dictionary entry for the word is displayed. In some embodiments of the invention, the information is provided from Internet sites, such as online dictionaries, encyclopedias and map sites.

In some embodiments of the invention, the user is asked to choose between different suggestions, meanings or corrections. For example, if the city Springfield is mentioned, the user may be requested to choose among the multiple cities having that name, and/or the option "show city closest to you" accounting for personal registry information.

Instead of each word involving display of a single type of information, some words may involve displaying a plurality of pieces of information, for example both a map and a weather forecast for a city. Alternatively or additionally, the information to be displayed is selected responsive to a context of the discussion. For example, if any of a list of words relating to the weather (e.g., rain, hot, humidity) were mentioned in the audio signals within a predetermined time, a weather forecast is displayed for locations and otherwise a map is displayed. As another example, if the word train or bus was mentioned, a time-table is optionally displayed for transportation to the location. In some embodiments of the invention, the decision also or alternatively depends on the extent of correlation between the user personal information (e.g., registry information, or information stored locally on the user's device, like a file on his computer, or information gathered from previous or current session), for example the information to be displayed is chosen according to the distance between the named location and the location of the user.

In some embodiments of the invention, the information to be displayed is selected responsive to non-speech attributes and/or content of the input signals, such as coughing or background traffic noise. Alternatively or additionally, the information to be displayed is selected in response to an analysis of the text used by the speaker, such as the language level used by the speaker. In some embodiments of the invention the information to be displayed is selected at least partially based on personal information the speaker says about himself. This information may be retrieved using grammar inflection, such as by identifying sentences beginning with "I am", and using their content. Alternatively, the information to be displayed is selected based on personal information provided by the speaker at enrollment.

Many other information displays may be provided, such as price comparisons for products mentioned in the audio signals and/or a list of patents or other documents related to the word. In some embodiments of the invention, a web search for a word or term is provided, for example using any of the methods described in U.S. Pat. No. 7,027,987 to Franz et al., issued Apr. 11, 2006, the disclosure of which is incorporated herein by reference.

In some embodiments of the invention, some types of information are provided only for words repeated in the input audio signals at least a predetermined number of times and/or otherwise considered a basic component of the received audio signals, for example because other words of a related subject are included in the received audio signals.

Optionally, the user can configure system 100 with rules governing which information is to be displayed.

In some embodiments of the invention, correlation database 127 is dynamically adjustable by feedback received from users. The feedback optionally includes indication of a level of usefulness of displayed information, an indication of whether more or less detail is desired and/or indication of desired information not provided. Optionally, in subsequent sessions, the information provided is selected based on the feedback from the specific user. Alternatively, the information provided in subsequent sessions is adjusted according to the accumulated feedback from all users or based on feedback from a sub-group of users to which the user belongs. In some embodiments of the invention, the effect of the feedback on information provided to a user is adjusted according to the feedback in a manner that the feedback of users more similar to the user has more weight. Alternatively or additionally, feedback provided recently, for example during the current communication connection, is given more weight than older feedback.

In an exemplary implementation of this embodiment, a logical model for matching relevant content is generated for a group of users having common attributes and/or belonging to a mutual club. In another example, feedback is collected or specifically categorized if received from frequent online shoppers of books. Focusing on a specific group of people with shared attributes may facilitate recognition. Also, the similarity of the members of such groups may aid perfecting selection of relevant information to content to display. Furthermore, the communal or social activities of the group might facilitate commercially targeting people with the same tendencies, or facilitate collecting statistical feedback of only individuals that are commercially relevant to the advertiser.

In an exemplary implementation of this embodiment, information, whether raw (i.e., the original transcript) or processer, can be use to augment or expend any database, that can be part of system 100, or external to the system, and/or belonging to an outside source or third party. This information can be used for surveys or any statistic study or research. By collecting the input information and/or recording it and/or documenting it, the system can channel not only relevant output to the user but also relevant data to possible beneficiaries, or for any purpose that might advantage a large statistical sample that can also utilize the system 100 abilities in order to further analyze and/or categories bodies of information. Alternatively or additionally, the statistical information can be factored into a semantic map or logical model or algorithm that the system is using or is based upon, in order to improve on it or keep it constantly updated. Alternatively or additionally, the collected statistical information can be used by refining or improving the methods used by the system, for any further or future or consecutive sessions, or can be used also for the current session, recalculating the semantic map or logic model or algorithm in real-time. Optionally, generated statistical information, or information processed and/or sorted by the system can either be used in such a way as described for objects of the system itself and/or for objects of other systems or processes.

Advertisements

The content may include, in some embodiments of the invention, advertisements selected responsive to words used in the discussion. The advertisements are optionally directed at inducing, promoting and/or encouraging purchase of products and/or services and/or acceptance of ideas. Optionally, the user to which the advertisements are displayed is not charged for display of the advertisements, but rather the provider of the advertisements is charged for their display.

The selection of the advertisements may be performed using any method known in the art, such as used by the Adsense software and/or that described in U.S. patent publication 2007/0186165 to Maislos et al., published Aug. 9, 2007, the disclosure of which is incorporated herein by reference. In some embodiments of the invention, system 100 displays both advertisements and other information. Optionally, the other information is displayed only if the user agrees to displaying the advertisements. In addition to aiding in receiving agreement to the display of advertisements, the combined display of information with the advertisements increases the chances that the user will view and/or pay attention to the advertisements which are displayed near or are surrounded by targeted information.

Alternatively or additionally, other methods are used to increase the chances that advertisements are viewed by the user. Optionally, when the advertisements are displayed on a screen of a mobile station during a conversation, the advertisements are displayed only when the mobile station is connected to an earphone, such that it is expected that the user is not holding the screen against his ear in a manner which prevents viewing the advertisements. Alternatively or additionally, system 100 keeps track of the time advertisements were displayed while the mobile station is connected to an earphone. In some embodiments of the invention, advertisements are displayed on a terminal of a user only when the user is silent, or more weight is given in billing the advertiser for advertisement time when the user is silent.

In some embodiments of the invention, advertisements, or other information, are displayed only when determined that a user is in the vicinity of the screen on which the data is displayed. For example, display 112 may be associated with a presence sensor, such as a camera, which indicates when a user is near the display and/or looking at the display. In an exemplary embodiment of the invention, display 112 is associated with a proximity sensor which shuts down the display when too close to a user.

Optionally, advertisements are displayed especially when the communication device is in a preferable state in which it is loading a software or downloading a file from the Internet and/or is limited in use for other tasks. In some embodiments of the invention, system 100 keeps track of the time advertisements are displayed in a preferable state.

In some embodiments of the invention, advertisements, or other information, are displayed responsive to detected specific conditions, for example if a monitoring system is collecting images that attest to a traffic jam or a red light in the next intersection, advertisements are displayed on electronic billboards. Optionally, billing is determined accounting to the specific conditions where users or targeted audience is more susceptible to advertisements.

Optionally, microphone 104A collects audio signals generated for a predetermined time during and/or after displaying the advertisement, as feedback on the advertisement. In some embodiments of the invention, the collected audio signals are passed to the advertiser or other entity for manual analysis. Alternatively, the collected audio signals from the time of the advertisement display are analyzed to find references to the advertisement, based on keywords in the advertisement and/or a search for the word "advertisement" or related words. In some embodiments of the invention, the advertiser is billed according to the number of times words which may be related to the advertisement are collected by microphone 104A, during a predetermined time after display of the advertisement. In some embodiments of the invention, the billing is also adjusted according to the average number of times these words appear in conversations in which the advertisement is not displayed. Optionally, in these embodiments, a list of words which may be related to the advertisement is defined and system 100 counts the number of times one or more of these words is collected. Other methods of assessing the exposure of users to advertisements may be used, such as counting the users that follow a link provided by the advertisement.

Further Input to Aid Selection of Information

In some embodiments of the invention, the information to be displayed is selected based on further information beyond the contents of the input audio signals. Such information may include, for example, time or date, user location (e.g., based on GPS readings), user socio-demographic information (e.g., age, gender), user interests and/or information from previous sessions of the user. The information may be collected from the current terminal selecting the display and/or based on information from other terminals not involved in the current information display.

Other information can be derived not just from words or phrases but also from indications or cues that can present themselves indirectly, or from a more general analysis, possibly of a large portion of the conversation. Such information may include, for example, repetition of a certain term, or the consistency of a certain subject. Another example can be the type and/or quality of the relationship of the conversing users, such as a professional relationship or of a romantic inclination. This example can provide helpful information on the nature of the current session and also on each individual participating. By speaking in a certain terminology or by revealing affection, there is much that can be known about the user, and accordingly the information displayed to the user may be selected by matching unit 110. Additionally, a user may expose information about himself, particularly his personality or state of mind or convictions or beliefs or any indications regarding what content is best relevant for him, or most appropriate in this specific time. A user, for example, can speak assertively, or be shy about his choice of words. A user, as a further example, can use harsh phrases frequently to express anger. Users can also excessively talk in modern slang, which can imply they are young. By being also attentive to such information, the system improves on the profile of the user, producing more exact or desirable results, whether temporarily (only relevant currently) or in further or later use of the system.

In some embodiments of the invention, the process of matching content or determining the most appropriate result to output is based or assisted or supported by additional characteristics of the users or cues in the conversation that are not necessarily literal or expressed in the textual transcription or in the lingual sequences. Such information may include, for example, indications of the qualities or characteristics of the sound of the voice of the user, such as pitch, tension and/or tremor, whispers and/or shouts, loudness, stutters or laughter and/or any recognition of audible expressions that can attest to the user's state or contribute to assessing the best match of content or most appropriate provided information for this user.

Content Display

The information selected by matching unit 110 is displayed or otherwise presented to the user. Alternatively, the selected information is added to a list from which the user can select desired information to be displayed. In some embodiments of the invention, when the user terminal has a large cache, some or all of the listed information is cached on the terminal, to allow the user immediate view when selecting an item from the list. When not cached, bandwidth is not wasted on downloading information that the user is not interested in. This option is particularly useful for wireless devices or other devices having limited bandwidth. Providing the list, however, allows the user to easily select the desired information without wasting time on searching and/or defining the desired information.

In an exemplary embodiment of the invention, the information is displayed on a computer, for example in parallel to conducting an instant messaging voice conversation. In some embodiments of the invention, the display is carried out by a screen saver software. For example, the screen saver may display information and/or advertisements in response to words in conversations in the vicinity of the computer. In other embodiments of the invention, the information is displayed on the screen of a mobile device, such as a cellular telephone.

In other embodiments of the invention, information is displayed publicly in response to signals collected from a specific area. For example, information selected responsive to conversations taking place in a shopping mall may be displayed in a display window of a shop of the mall, possibly in a display window facing the specific area from which the conversations are collected.

It is noted that in addition to displaying the information on the user terminal or alternatively to displaying on the user terminal, the information may be displayed on a different device, possibly in a different location. This alternative may be used, for example, to allow peers in a social network to keep updated about each other.

In some embodiments of the invention, sound and/or video content is displayed to the user responsive to the recognized audio signals. For example, background music related to words in the conversation may be sounded to the user. In an exemplary embodiment of the invention, songs associated with recurring words appearing in the recognized audio signals are sounded. In another example, background music matching the mood of a user participating in an input conversation, is sounded.

Charges

In some embodiments of the invention, users are charged for the information service. Optionally, the user is charged a one time sum for installation of a software, which governs the display of the information. Alternatively or additionally, the user is charged a fixed monthly rate. Further alternatively or additionally, the user is charged according to the amount of information for which he requests further information.

In other embodiments of the invention, the users are not charged for the information provided, but rather the cost of providing the information is covered by displaying advertisements. Alternatively or additionally, the information is provided by a service provider which benefits from the increase in traffic due to the provision of the information to the client. In some embodiments of the invention, the communication services of the user are subsidized, for example for large volume use of the information service and/or for display of advertisements.

Architecture

In some embodiments of the invention, the tasks of recognition unit 108, matching unit 110 and display 112 are performed in a single location, possibly by a single processor or a single terminal. Alternatively, one or more of the tasks is outsourced to a separate, possibly remote, apparatus or system. For example, some or all of the signals may be transmitted to a remote recognition unit for speech recognition. Alternatively or additionally, matching unit 110 is located on a remote central server. The recognized, transcribed and/or translated text is transmitted to the remote server and information to be displayed or addresses from which to retrieve the information, are returned. Alternatively, as described above, the selection of content is performed locally, but the content itself is retrieved from a remote server, for example over the Internet.

The display may also be in a different location from the input location and/or recognition unit 108. For example, the input signals may be acquired and converted into text on a cellular phone, and the text is transmitted to a user computer where it is matched to content which is displayed on the screen of the computer.

The selected information may be provided to the user immediately during the conversation, or may be supplied to the user at a later time, for example when the information requires substantial amount of reading time and may distract the user from the conversation. Optionally, the user chooses when and/or how the selected information will become available to him or be presented to him.

In an exemplary embodiment of the invention, system 100 is implemented on a home entertainment center, providing also television shows. By collecting signals associated with the use of the home entertainment center, system 100 records TV shows that were matched to the user's interests, even if he/she is not presently using the system. Optionally, advertisements added by system 100 are presented when the user watches the recorded content. In an exemplary embodiment of the invention, system 100 identifies keywords and/or dominant pictures appearing in programs watched by the human user. Alternatively or additionally, system 100 identifies the interests of the user from conversations of the human user. The programs that are recorded may be identified from a TV guide or any other index, or may be stored online and then analyzed to determine whether their content matches the profile of the user interests.

In an exemplary embodiment of the invention, system 100 is implemented on a cellular phone and provides content responsive to conversations of the cellular phone with other telephones. While a telephone connection is in operation, the cellular phone manages an additional data connection with a central server of system 100 which aids in performing one or more of the tasks of system 100.

Figure 2:
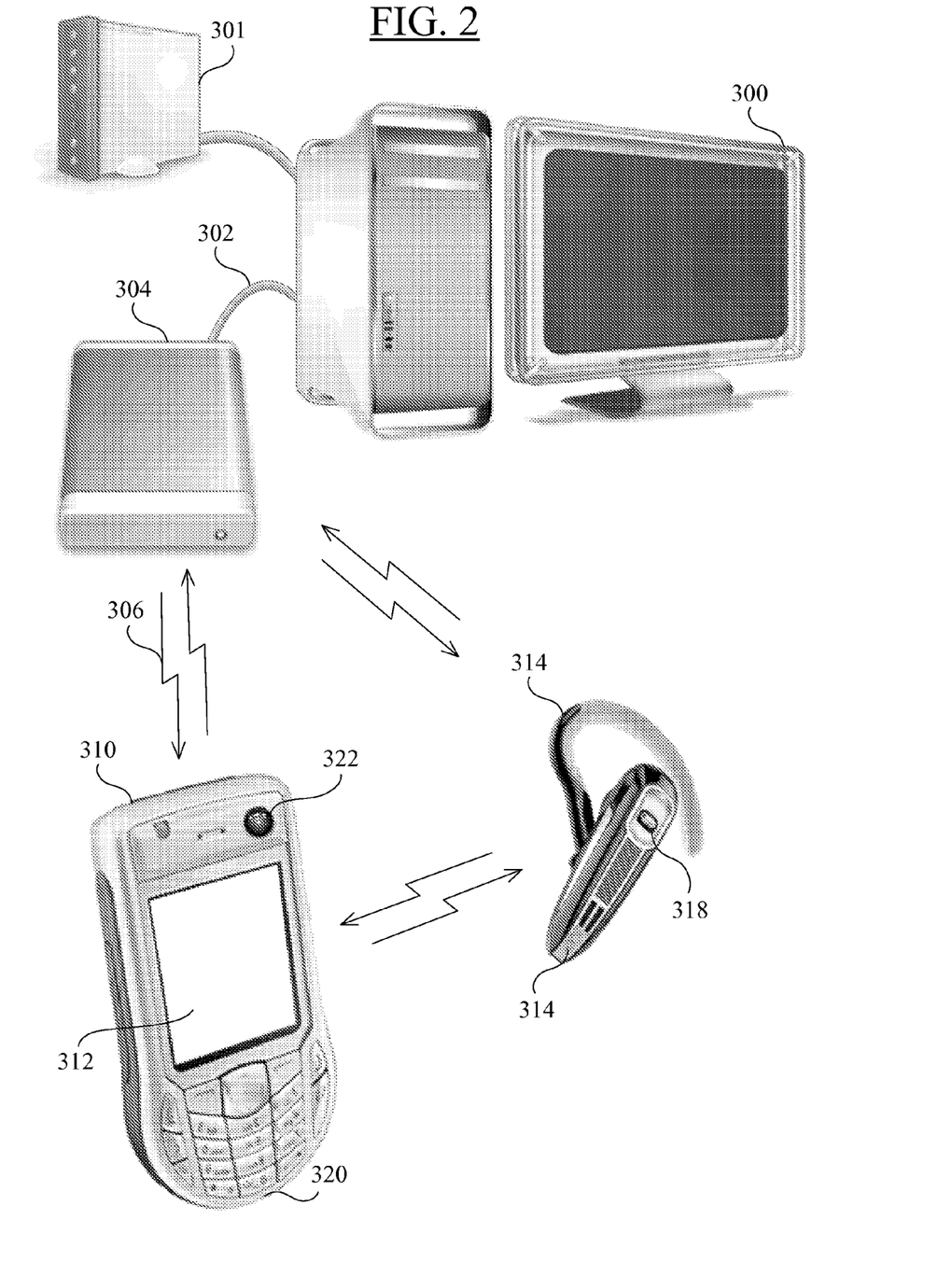
FIG. 2 is a schematic view of an implementation with a Wi-Fi phone system, in accordance with an exemplary embodiment of the invention.

FIG. 2 is a schematic view of an implementation with a Wi-Fi phone system, in accordance with an exemplary embodiment of the invention. A base system 300 is connected to the internet. In addition it is connected, for example through a cable 302, to a Wi-Fi router 304 that communicates over a wireless link 306 using the 802.11x protocol with nearby devices such as a Wi-Fi phone 310. Alternatively, Wi-Fi phone 310 is connected to base system 300 through a USB cable 308. Wi-Fi phone 310 can use either integrated microphone 320 or a cord-free earphone such as a Bluetooth earphone 314 having microphone 316 to capture sound waves. In addition or alternatively, an integrated camera 322 of phone 310 or an integrated camera of earphone 318 can be used to capture images. Captured audio signals and/or images are than processed as described above regarding FIG. 1 to create content presented on the display screen of phone 310. The user of phone 310 may have an incentive to use system 100 by having free calls in exchange for being presented 112 with commercial content. In addition the phone user might be paid for each commercial content presented on the phone. Alternatively or additionally, advertisements are provided together with useful content which the user considers of value.

Semantic Map

In some embodiments of the invention, a semantic map is used to aid in speech recognition and/or in content selection, as is now described.

Figure 3A:
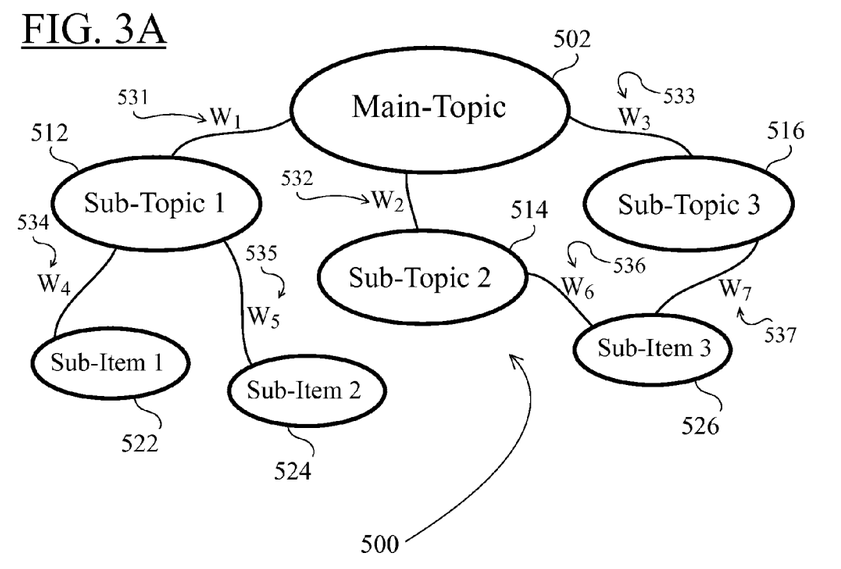
FIG. 3A is a schematic illustration of a portion of a semantic map 500, used in accordance with an exemplary embodiment of the invention.

FIG. 3A is a schematic illustration of a portion of a semantic map 500, used in accordance with an exemplary embodiment of the invention. FIG. 3A shows a main topic 502, having three sub-topics 512, 514 and 516, which in turn have sub-items 522, 524 and 526. Each node in semantic map 500 represents a word or term and its sub-nodes represent words which are sub-units of the parent node. For example, the term "human voice" may have the sub-topics: "talk", "song" and "laughter". The nodes are connected to related sub-nodes by branches, marked 531-537.

Figure 3B:
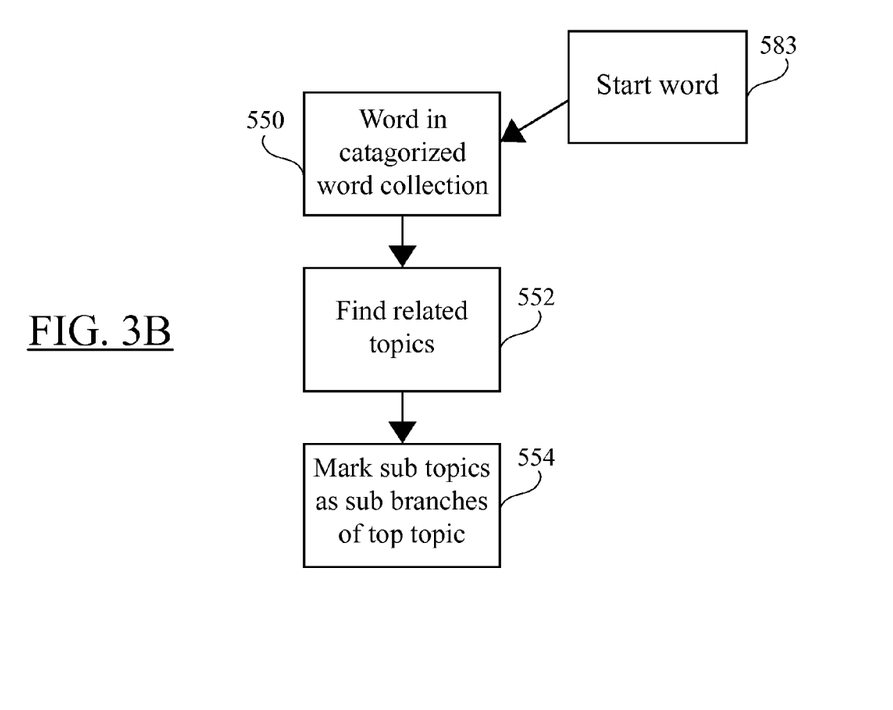
FIG. 3B is a flowchart of a computerized method of creating a semantic map 500, in accordance with an exemplary embodiment of the invention.

FIG. 3B is a flowchart of a computerized method of creating a semantic map 500, in accordance with an exemplary embodiment of the invention. Beginning from a starting point word (583), a categorized word collection, such as Wikipedia, is accessed to find (550) the word therein. Related words having a narrower meaning are retrieved (552) from the word collection and added (554) to map 500 as sub-topics of the word. This process is repeated for the sub-topics, until the map is completed. In some embodiments of the invention, the map comprises a tree in which each node has only a single parent. Alternatively, the map is not a tree and nodes may relate to a plurality of different parent terms.

In some embodiments of the invention, the method of FIG. 3B is performed using a single categorized word collection. Alternatively, the method is performed using a plurality of word collections.

System 100 may generate a single semantic map 500 for repeated use with speech recognized words. Alternatively, a separate semantic map is generated for each speech session or file.

Alternatively to computerized generation of the semantic map, the semantic map may be created partially or entirely manually.

Figure 4A:
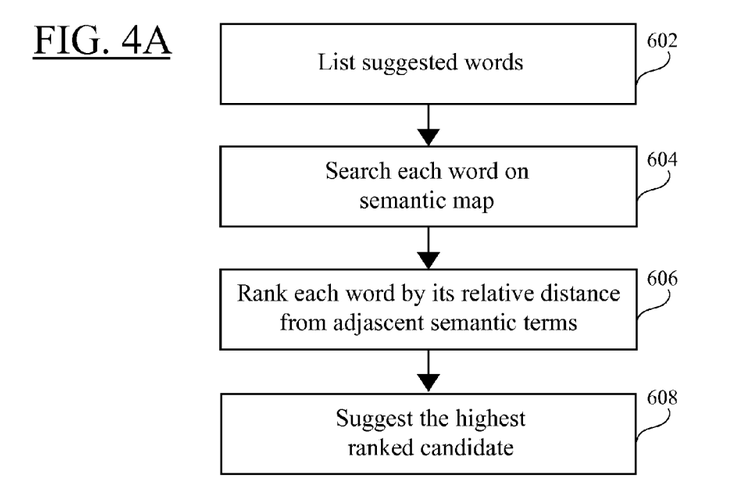
FIG. 4A is a flowchart of acts performed in disambiguation of speech recognition results, in accordance with an exemplary embodiment of the invention.

FIG. 4A is a flowchart of acts performed in disambiguation of speech recognition results, in accordance with an exemplary embodiment of the invention. During a speech recognition session, for each recognized word, a counter associated with the entry of the word in the semantic map is incremented. Optionally, when a word does not clearly match a single word, the speech recognition provides (602) a list of words which may have been intended by the speaker. For each of the words in the list, a score is calculated (606) based on the distance between the corresponding entry of the word and adjacent entries whose counter was incremented and/or the number of occurrences of adjacent entries in the speech session. In an exemplary embodiment of the invention, the score is equal to minus the shortest distance in branches from the two neighboring words from the left and right side of the suggested word. The word in the list having the highest score is optionally used (608).

Figure 4B:
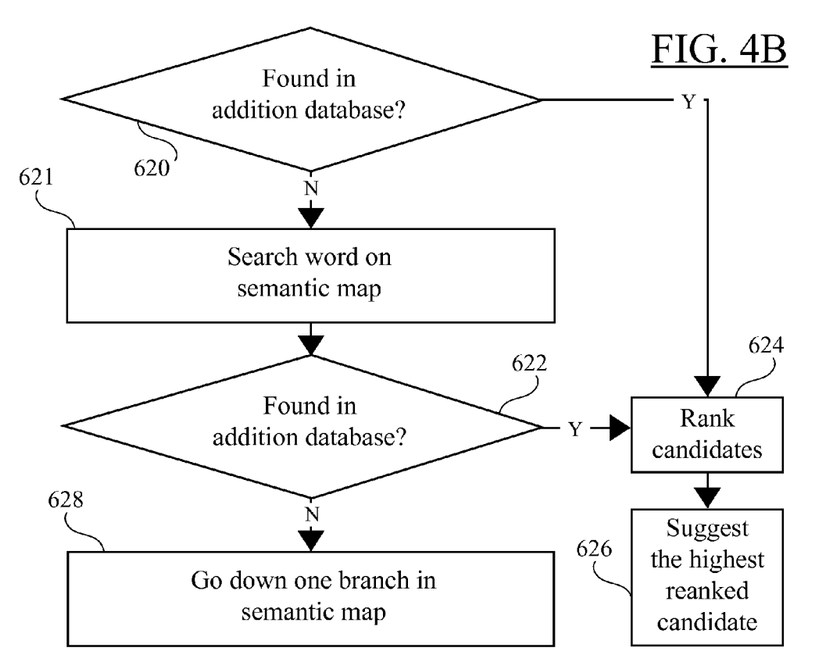
FIG. 4B is a flowchart of acts performed in selecting content corresponding to a speech session, in accordance with an exemplary embodiment of the invention.

FIG. 4B is a flowchart of acts performed in selecting content corresponding to a speech session, in accordance with an exemplary embodiment of the invention. A predetermined database correlates between identified words and content to be displayed responsive thereto. Given a recognized word, matching unit 110 determines (620) whether the word appears in the database. If the word does not appear in the database, semantic map 500 is searched (621) for neighboring words in the map, which do appear in the database. The words found in the database are given (624) a ranking score and accordingly content for display is selected (626).

In some embodiments of the invention, the ranking score is a function of the distance, measured for example as the number of branches separating, in the semantic map, the nodes representing the original word and the word found in the database. Alternatively or additionally, the ranking score depends on the number of words in the speech session in the vicinity of the ranked word in the semantic map. Further alternatively or additionally, each of the branches (531-537) is assigned a weight Wi, which indicates a measure of the relation between the nodes connected by the branch. The distance between two nodes is optionally a function of the weights of the branches connecting the nodes, for example the product of the weights of the branches connecting the nodes. The distance between two nodes connected in a plurality of different paths is optionally a function, such as average, maximum or minimum, of the weights of the different paths.

In some embodiments of the invention, the weights of the branches are determined automatically from an external database, such as Wikipedia, by determining the strength of the relation between the two terms. For example, the strength of the relation may be determined based on the number of times the terms of the nodes are mentioned together and/or based on the number of users moving from one to the other in Wikipedia.

In some embodiments of the invention, the semantic map is hierarchical, in other embodiments, the semantic map is non hierarchical, and in other embodiments it is not hierarchal.

In some embodiments of the invention, the semantic map is used for items taken from a speech session, in other embodiments it is used with visual objects and in other embodiments it is used for text items.

In some embodiments of the invention the semantic map comprises text objects and/or sound objects and/or visual objects.

In some embodiments of the invention the semantic map is used for web based advertising such as Google (www.google.com) advertisement. Currently, an advertiser purchases advertisements for specific words. Using the semantic map, the advertiser can buy the word, and all the words close to it in the semantic map (for example, within a certain number of branches of separation from that word), or a word and all the words that are below it in a hierarchical semantic map.

Other Uses

Figure 5A:
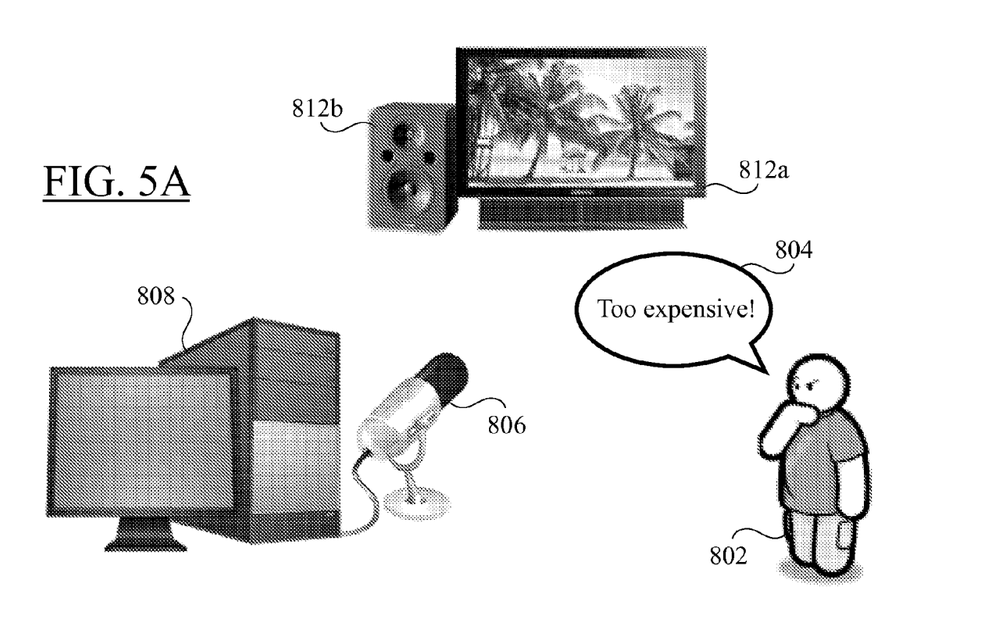
FIG. 5A is a schematic view of usage of a speech recognition system in an advertisement environment, for example in front of a shop window, in accordance with an exemplary embodiment of the invention.

FIG. 5A is a schematic view of usage of a speech recognition system in an advertisement environment, for example in front of a shop window, in accordance with an exemplary embodiment of the invention. A microphone 806 is implanted in proximity to a point where people 802 are expected to view advertisements or other commercial setups (e.g., a shop window setting). Microphone 806 captures comments 804 of viewers of the commercial setup and passes the captured audio signals to a computer 808, which optionally converts the acquired speech into text and/or otherwise processes the acquired signals for review by the shop owner or advertiser. Responses of viewers may be collected by sensors other than microphone 806, such as a camera or a touch sensor. The microphone may be placed in a hidden location or may be easily viewed in order to encourage responses.

In some embodiments of the invention, audio or video responses to the content of an electronic-shop displayed over the Internet are collected. Optionally, the responses are collected through microphones and/or cameras of computers of home users viewing the e-shop. Responses are optionally collected from many users and analyzed to find entries of interest, for example by finding statements that include words relating to the content of the e-shop. In some embodiments of the invention, the contents of the audio responses are automatically converted into text and/or automatically aggregated to provide a short summary of the responses to an owner of the e-shop.

Figure 5B:
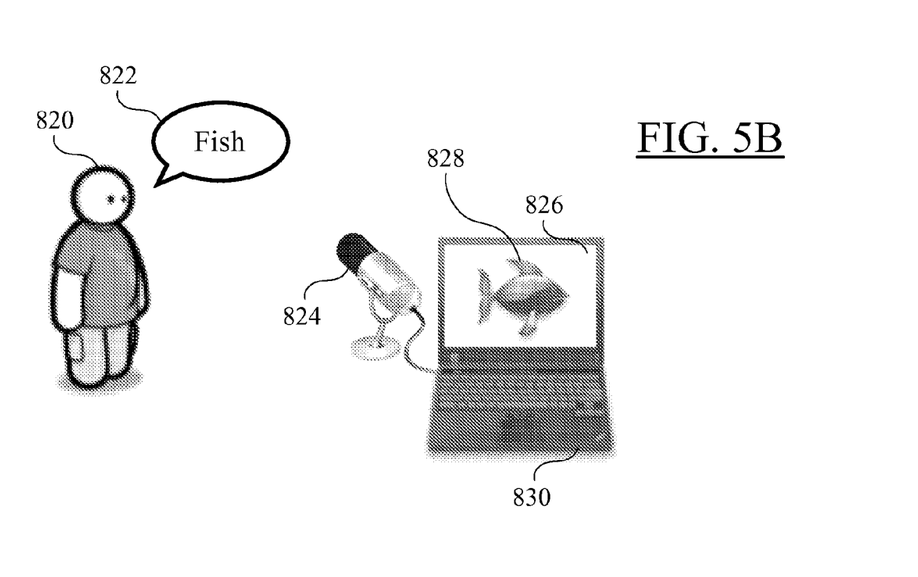
FIG. 5B is a schematic view of usage of an automatic speech recognition (ASR) with younger population, in accordance with an exemplary embodiment of the invention.

FIG. 5B is a schematic view of usage of an automatic speech recognition (ASR) with younger population, in accordance with an exemplary embodiment of the invention. A child 820 would say a word 822 describing the object he wants to see. The word 822 is captured by a microphone 824 and sound is processed by a computer 830, for example a laptop computer, that does the ASR and presents the relevant picture 828 on screen 826. The system could make an educational game in which toddlers learn how to pronounce nouns. For example a toddler would learn how to pronounce the word dog as once he pronounces it right a picture of a dog is presented.

The speech recognition abilities may be used for transcription and/or translation of speech signals in voice and/or video messages.

Another possible example is in a slightly different configuration in which the text is sent to another handset. For example one user could leave a voice mail to another user and the user would receive it is as a text message, for example an SMS.

In an exemplary embodiment of the invention, any of the methods described above may be used in determining elements in a computer game or an interactive environment. Optionally, a game involving player speech may analyze the player speech and accordingly select a continuation of an adventure game. For example, a nervous player according to his speech may be given an easier task than more confident players.

Another possible example is in collecting input signals from web aliases, profiles, accounts or personas that are exclusively virtual but belong to a user. For example, if a user registers a character in SecondLife, he might conduct a voice conversation with other characters in SecondLife. Such conversation may be speech recognized for the benefit of advertisers, SecondLife administrators, a community of SecondLife characters and/or of the specific user.

In an exemplary embodiment of the invention, system 100 is used to provide information to customers calling a service center for technical support or ordering products. According to an analysis of the conversation, an automatic response may be sent to the customer apologizing for a long waiting period or providing additional information. The automatic response may be provided by email or may be printed and sent along with an ordered product. For example, along with an ordered pizza, system 100 may automatically generate a customized advertisement printed on the pizza (or other product) casing, based on the conversation with the service or ordering center.

Optionally, the analysis of conversations is used also to collect statistical information from a plurality of conversations. For example, the statistics may include the frequencies of use of various words and the distributions of talking attributes in different age groups.

In an exemplary embodiment of the invention, the non-advertisement information is provided in order to allow collection of the statistical information.

In an exemplary embodiment of the invention, system 100 is part of a security network or other closed networks such as a business network. A security network might be sponsored by advertisement and provide captured signals of the crowd for both the advertisers and for security objects. A professional network might facilitate the communication between colleagues, for example by utilizing collected signals to better supply each worker with the relevant information from inside the company database, like finding similar projects in other departments. The professional network might be connected to a specific database that is relevant to the workers, or is manageable by administration, like displaying reminders on bathroom screens to wash their hands, or displaying useful information about changes in the corporation. Optionally, workers will benefit from the service of system 100 of matching relevant information that will be presented additionally to management information, and/or information designated by administration.

Images

While the above description emphasized providing content in response to audio signals, any of the above embodiments may be implemented in a similar manner based on matching information to images. Optionally, images captured by camera 104B or received from any other source are searched to identify known images and information and/or advertisements are matched to the identified known images. For example, if an image of an iPod is identified, an encyclopedia entry on the iPod may be provided and/or an advertisement for add-ons to the iPod is presented. In another example, the appearance of a person might assist in matching relevant content, such as the clothes the person is wearing, how much makeup the person is using, an estimation of an age group of the person and/or a mood of the person.

The image recognition may be performed using any method known in the art, such as those described in US patent publication 2006/0012677 to Neven et al., published Jan. 19, 2006, US patent publication 2007/0175998 to Lev, the disclosures of which are incorporated herein by reference.

Figure 6:
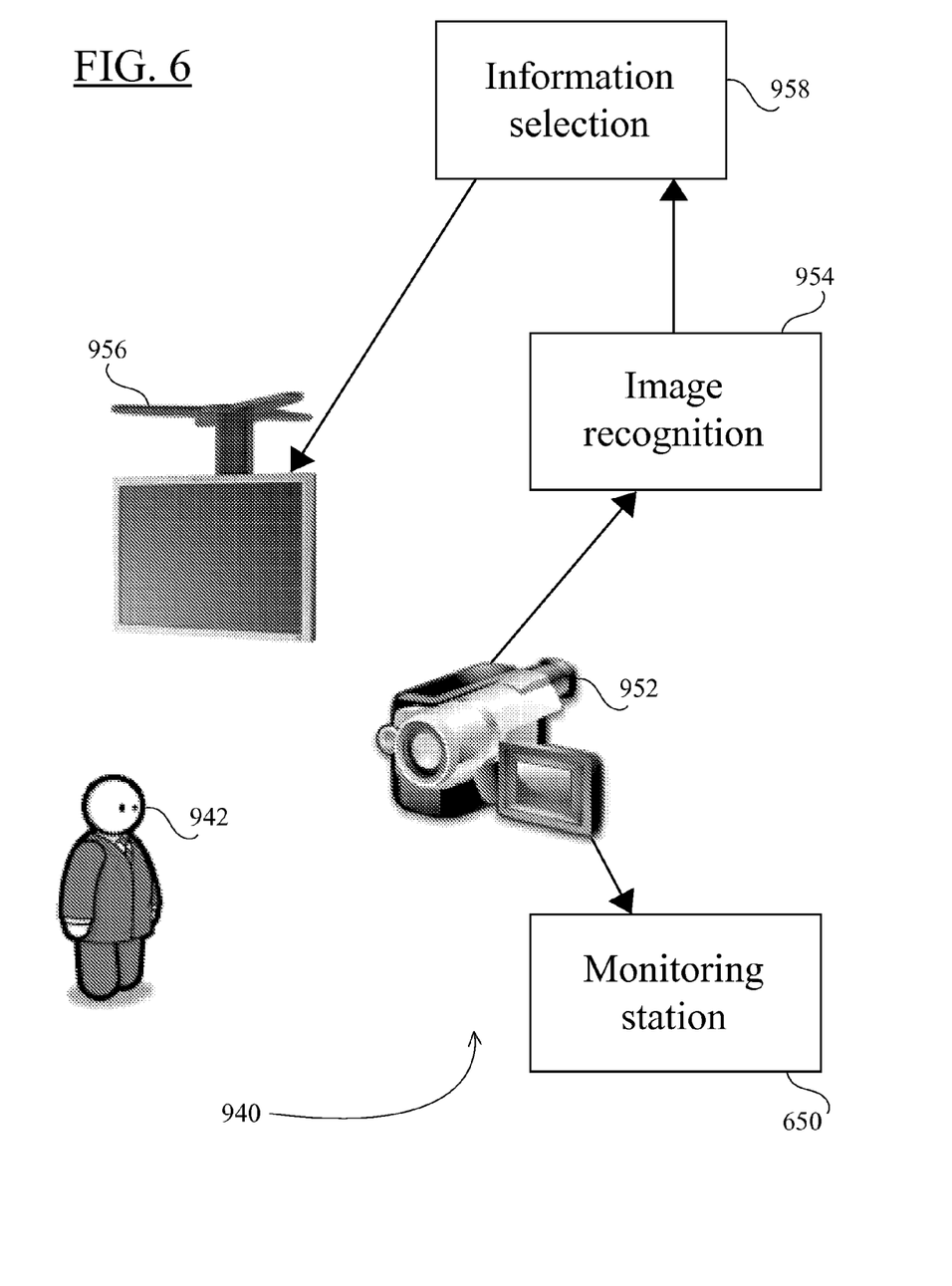
FIG. 6 is a schematic illustration of an information display system, in accordance with an exemplary embodiment of the invention.

FIG. 6 is a schematic illustration of an information display system 940, in accordance with an exemplary embodiment of the invention. System 940 comprises a camera 952 which acquires images, optionally a video stream of images. The images are provided to an image recognition unit 954 which identifies objects of interest in the images. Information on the identified objects and optionally their attributes is forwarded to an information selection unit 958 which determines accordingly what information is to be displayed on a display 956, using any of the above described methods.

In an exemplary embodiment of the invention camera 952 may monitor people, such as person 942, standing near display 956 and select advertisements for display 956 according to attributes of the people. For example, advertisements directed to a child audience may be displayed when image recognition unit 954 identifies a large percentage of children in the images acquired by camera 952. Alternatively to being directed at a location from which display 956 is viewed, camera 952 may view an entrance to a shop or other closed area in which display 956 displays advertisements or other information. The advertisements displayed are optionally selected according to the average profile of people entering the shop.

In some embodiments of the invention, the advertisements are selected responsive to behavior against rules identified in the images of camera 952. For example, when a camera monitoring a printer at a work place identifies misuse of the printer it may show on display 956 a warning and/or use instructions.

Camera 952 is stationary, in some embodiments. In other embodiments of the invention, camera 952 is a portable camera, possibly mounted on a mobile communication terminal. In these embodiments, display 956 is optionally the display of the mobile terminal. Alternatively, display 956 is separate from the mobile terminal, which periodically transmits information selection instructions to the display. In some embodiments of the invention, camera 952 stores the selected information until the mobile terminal is connected to a base computer. Camera 952 may also be mounted on home and/or office appliances, such as refrigerators.

In some embodiments of the invention, the images from camera 952 are additionally provided to a monitoring station 950. Thus, camera 952 is used for two different tasks and the cost of camera hardware is reduced. In some embodiments of the invention, installation of system 940 is financed by the advertisements.

CONCLUSION

It will be appreciated that the above described methods may be varied in many ways, including, changing the order of steps, and/or performing a plurality of steps concurrently. It will also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Variations of embodiments described will occur to persons of the art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method of providing information, comprising:
   providing a communication session of at least one of audio and video media;
   applying automatic recognition to media transferred on the communication session;
   selecting an advertisement, by a processor, based on the automatic recognition;
   selecting non-advertisement information, by the processor, responsive to the automatic recognition; and presenting the selected advertisements and the selected non-advertisement information, during the communication session,
   wherein selecting non-advertisement information comprises selecting a map related to a term identified on the communication session by the automatic recognition.

2. A method according to claim 1, wherein providing the communication session comprises providing a communication session of a single human, with an automatic opposite end terminal.

3. A method according to claim 1, wherein providing the communication session comprises providing a communication session between a plurality of human users.

4. A method according to claim 1, wherein providing the communication session comprises providing a communication session with at least one instant messaging software end point.

5. A method according to claim 1, wherein providing the communication session comprises providing a communication session with at least one mobile station end point.

6. A method according to claim 1, wherein applying automatic recognition to media transferred on the communication session comprises applying the automatic recognition by an end terminal of the communication session.

7. A method according to claim 6, wherein applying the automatic recognition by an end terminal of the communication session comprises applying the automatic recognition with aid from a remote server.

8. A method according to claim 1, wherein selecting non-advertisement information comprises selecting a dictionary or encyclopedia entry on a term identified on the communication session by the automatic recognition.

9. A method according to claim 1, wherein selecting non-advertisement information comprises selecting the non-advertisement information also responsive to information on a human participant in the session, which information was collected by the processor before the communication session began.

10. A method according to claim 1, wherein presenting the advertisement and non-advertisement information comprises displaying both the advertisement and non-advertisement information on a single display.

11. A method according to claim 1, wherein presenting the advertisement and non-advertisement information comprises displaying on a display of an end terminal of the communication session.

12. A method according to claim 1, wherein presenting the advertisement and non-advertisement information comprises conveying at least one of the advertisement and non-advertisement information audibly.

13. A method according to claim 1, wherein presenting the advertisement and non-advertisement information comprises conveying at least one of the advertisement and non-advertisement information to a human user at least 30 minutes after it is selected.

14. A method according to claim 1, wherein selecting the non-advertisement information comprises selecting information from a web site of user generated content.

15. A method according to claim 1, wherein selecting the non-advertisement information comprises selecting a transcription or translation of audio signals passing on the connection.

16. A method according to claim 1, wherein selecting the non-advertisement information comprises selecting information in a local memory associated with the processor.

17. A method according to claim 1, wherein selecting the non-advertisement information comprises selecting information retrieved from a remote server.

18. A method of providing information, comprising:
providing a video stream;
applying automatic image recognition to the video stream;
selecting information responsive to the image recognition; and
displaying the selected information within ten minutes from performing the image recognition leading to selection of the displayed information,
wherein providing the video stream comprises providing a video stream acquired by a camera included in a mobile communication terminal.

19. A method according to claim 18, wherein displaying the selected information comprises displaying within ten minutes from acquiring images of the video stream leading to the selection of the information, by a video camera.

20. A method according to claim 18, wherein providing the video stream comprises providing a video stream acquired by a portable video camera.

21. A method according to claim 18, wherein displaying the selected information comprises displaying advertisements.

22. A method of matching information to a word sequence, comprising: providing a semantic map; receiving a word sequence, by a processor;
determining locations of words of the sequence in the semantic map;
selecting information for the word sequence, at least partially responsive to the locations of the words of the sequence in the map; and displaying the selected information.

23. A method according to claim 22, wherein providing the semantic map comprises providing a map from a web site of user provided content.

24. A method according to claim 22, wherein selecting the information comprises providing a list of keywords and corresponding information for display and selecting a keyword from the list based on its distance in the semantic map from words of the sequence.

25. A method according to claim 22, wherein receiving a word sequence comprises receiving a word sequence received from a speech recognition unit.

26. A wireless communication terminal, comprising:
a communication session interface configured to conduct at least one of audio and video media communication sessions with remote terminals, over a wireless link; a display;
an earphone interface; and a processor configured to display advertisements on the terminal responsive to whether an earphone is coupled to the earphone interface.

27. A terminal according to claim 26, wherein the processor is configured to display advertisements on the display only when an earphone is coupled to the earphone interface.

28. A terminal according to claim 26, wherein the processor is configured to track the amount of time that advertisements were displayed while an earphone was coupled to the earphone interface.

29. A method of providing a person with information, comprising: acquiring sub-vocal speech from a person; identifying words in the acquired sub-vocal speech; and displaying content to the person responsive to the identified words.

30. A method according to claim 29, wherein acquiring the sub-vocal speech comprises acquiring by electrodes above the vocal chords of the person.

31. A method of acquiring feedback on a commercial setting, comprising:
providing a commercial setting; positioning a camera or microphone directed at a position from which individuals can view the commercial setting;
acquiring media signals by the camera or microphone;
applying media recognition to the acquired signals; and
generating feedback on the commercial setting having a storage size of less than 10% of a size of the acquired media signals.

32. A method according to claim 31, wherein generating the feedback comprises providing portions of the media signals including words which may relate to the commercial setting.

33. A method according to claim 31, wherein providing the commercial setting comprises providing an e-shop.

\* \* \* \* \*